(12) United States Patent
Boinet

(10) Patent No.: US 10,240,744 B2
(45) Date of Patent: Mar. 26, 2019

(54) HEADLIGHT WITH SCANNING LIGHT DEVICE

(71) Applicant: VALEO VISION, Bobigny (FR)

(72) Inventor: Loic Boinet, Le Mesnil Esnard (FR)

(73) Assignee: VALEO VISION, Bobigny (FR)

( * ) Notice: Subject to any disclaimer, the term of this patent is extended or adjusted under 35 U.S.C. 154(b) by 74 days.

(21) Appl. No.: 15/421,526

(22) Filed: Feb. 1, 2017

(65) Prior Publication Data

US 2017/0227185 A1    Aug. 10, 2017

(30) Foreign Application Priority Data

Feb. 8, 2016    (FR) ..................... 16 50964

(51) Int. Cl.
| | |
|---|---|
| *F21S 41/675* | (2018.01) |
| *F21K 9/64* | (2016.01) |
| *G02B 17/02* | (2006.01) |
| *G02B 26/08* | (2006.01) |
| *F21S 41/14* | (2018.01) |
| *F21S 41/25* | (2018.01) |
| *F21S 41/32* | (2018.01) |
| *F21S 41/33* | (2018.01) |
| *F21S 41/36* | (2018.01) |
| *F21S 41/37* | (2018.01) |

(Continued)

(52) U.S. Cl.
CPC .............. *F21S 41/675* (2018.01); *F21K 9/64* (2016.08); *F21S 41/14* (2018.01); *F21S 41/16* (2018.01); *F21S 41/25* (2018.01); *F21S 41/32* (2018.01); *F21S 41/335* (2018.01); *F21S 41/36* (2018.01); *F21S 41/365* (2018.01); *F21S 41/37* (2018.01); *G02B 17/023* (2013.01); *G02B 26/0833* (2013.01)

(58) Field of Classification Search
CPC ......... F21S 41/16; F21S 41/675; F21V 14/64; G02B 26/0816; G02B 26/0832; G02B 26/10
See application file for complete search history.

(56) References Cited

U.S. PATENT DOCUMENTS

| | | | | |
|---|---|---|---|---|
| 9,677,736 B2 * | 6/2017 | Ravier | ..................... | F21S 41/14 |
| 2016/0195232 A1 * | 7/2016 | Boinet | ................ | F21S 48/1225 |
| | | | | 362/510 |
| 2017/0198876 A1 * | 7/2017 | Boinet | ..................... | F21S 41/14 |

(Continued)

FOREIGN PATENT DOCUMENTS

| | | | | |
|---|---|---|---|---|
| FR | 3006746 A1 * | 12/2014 | ............. | B60Q 1/085 |
| JP | 2014029858 A * | 2/2014 | ............... | F21S 41/14 |

*Primary Examiner* — Ismael Negron
(74) *Attorney, Agent, or Firm* — Oblon, McClelland, Maier & Neustadt, L.L.P.

(57) ABSTRACT

A motor vehicle headlight and a motor vehicle illumination device, which includes at least one light source for emitting light rays, a wavelength conversion element arranged to receive the light rays on a zone and to re-emit a light radiation to produce a light beam, a reflecting element for redirecting light rays from the light sources towards the conversion element, and a scanning apparatus configured to scan the reflecting element with the light rays in a first direction between extreme positions, the reflecting element being configured to reflect light rays at said extreme positions to a central part of the zone so as to form the central part of the light beam.

16 Claims, 1 Drawing Sheet

Figure 1:
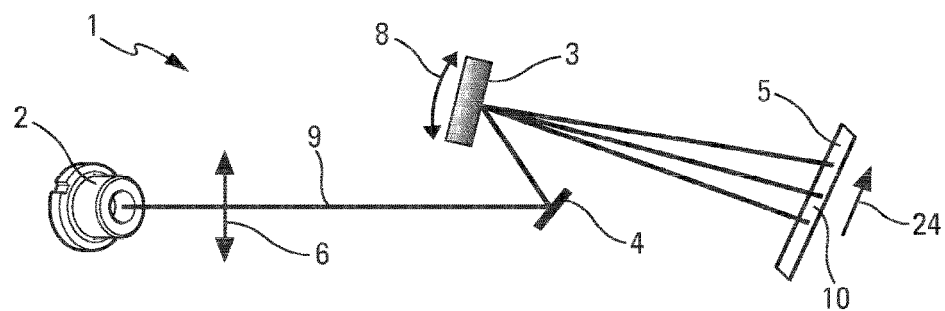

(51) Int. Cl.
*F21S 41/16* (2018.01)
*F21S 41/365* (2018.01)

(56) References Cited

U.S. PATENT DOCUMENTS

2017/0357004 A1* 12/2017 Puente .................... F21S 43/13
2018/0031195 A1* 2/2018 Albou ................... F21S 48/125

* cited by examiner

HEADLIGHT WITH SCANNING LIGHT DEVICE

The present invention relates to a scan light device, notably for a motor vehicle, provided with a light ray folding element, and a headlight comprising such a light device.

Motor vehicle headlights are provided with one or more optical modules arranged in a housing closed by an outer lens so as to obtain one or more light beams at the output of the headlight. Simply, an optical module of the housing notably comprises a light source, for example one (or more) light-emitting diode(s), which emit light rays, and an optical system comprising one or more lenses and, if appropriate, an optical element, for example a reflector, to orient the light rays from the light sources, in order to form the output light beam of the optical module.

Furthermore, other technologies can be used for these devices. Thus, there are laser diodes which can advantageously replace the light-emitting diodes. However, standard lasers are of a color which does not correspond to the regulatory colors of such headlights. The module then comprises a wavelength conversion element, which receives the light rays from the laser source and which re-emits them as white light to an optical projection system and thus forms a part of the light beam from the headlight.

To illuminate a wide zone of the conversion element with light rays, light ray scan means are necessary. Scan is performed at a frequency that is high enough for the human eye not to perceive the movement and to see continuous illumination from the beam leaving the module. The scan amplitude defines the displacement of light rays in space and therefore the size of the lit zone on the conversion element. In other words, for a one-dimensional scan, the rays are displaced between two extreme positions. Thus, the rays pass through substantially all the positions situated between these two extreme positions, and notably through one or more central positions relative to the extreme positions, which are central relative to the scan means.

Known scan means are for example elements of MEMS (Micro-Electro-Mechanical-System) type comprising one or more micromirrors which reflect the rays on the zone. These micromirrors are for example driven by at least one rotary movement about an axis which generates the scan of the zone in a first direction. A second micromirror or another rotary movement of the first mirror about a second axis at right angles to the first axis makes it possible to produce a scan in two directions.

The scan by the rays is performed from one edge to other of the illuminated zone of the conversion element. However, the scan cannot be at a constant speed over the entire width of the zone. In effect, the scan must stop at each edge of the zone, to start back in another direction to the other edge. In other words, the light rays are stopped in the extreme position in order to scan the zone to the other extreme position. Consequently, the illumination re-emitted by the conversion element is not uniform, illumination of the edge of the illuminated zone being more intense than that of its central part, the light rays passing more rapidly through the central positions.

In point of fact, it is actually desirable to obtain a light beam whose central part is more brightly illuminated than the sides, notably in order to comply with current regulations.

The invention therefore aims to obtain a light device which improves the situation and avoids the abovementioned defects, in order to obtain illumination which satisfies these regulations, which require more intense illumination on the central part than on the sides.

For that, the invention relates to a scan light device for a motor vehicle, comprising at least one light source capable of emitting light rays.

The device is noteworthy in that it comprises a wavelength conversion element arranged to receive the light rays on a zone and to re-emit a light radiation to produce a light beam, in that the device further comprises an element for folding the light rays back to the conversion element, and scan means configured to scan the folding element with the light rays in a first direction, the scan of the light rays being performed between extreme positions in said first direction, the folding element being configured to deflect the light rays which are at said extreme positions to a central part of the zone of the conversion element so as to form the central part of the light beam.

Thus, the more intense extreme positions of the light rays are deflected to the central part of the conversion element, and are therefore re-emitted by the conversion element in the central part of the light beam produced by the device. A light beam is thus obtained with a greater light intensity at the center than on the sides.

According to different embodiments of the invention, which may be taken together or separately:
- the scan of the light rays being performed by passing through central positions of the light rays, said central positions being situated substantially midway between the extreme positions, the folding element is configured to deflect the light rays which are at said central positions to the edges of the zone so as to form the sides of the light beam,
- the folding element is configured to deflect the scanned light rays from a first extreme position to a central position on the zone, such that these deflected light rays scan the zone from the central part of the zone to a first edge of the zone, and to deflect the scanned light rays from said central position to a second extreme position opposite the first extreme position on the zone, such that these deflected light rays scan the zone from the central part of the zone to a second edge of the zone opposite the first edge,
- the folding element makes it possible to invert, in the scan direction, the distribution of the light intensity produced on the conversion element by the scan means and the light rays,
- the amplitude of the scan defines the displacement of the light rays and therefore the central and the extreme positions that they take during scan,
- the central positions are at the center of the scan, and the extreme positions at the ends of the scan,
- the folding element is positioned on the optical path of the light rays, between the scan means and the conversion element,
- the folding element comprises two reflecting faces,
- the two reflecting faces are adjacent and form a V, the interior of the V being intended to reflect the light rays,
- the folding element is arranged in the axis of the scan means such that the vertex of the V receives the central positions of the light rays,
- the folding element is a mirror provided with two planes forming the two reflecting faces,
- the folding element comprises a block provided with two faces provided with a reflecting coating, notably of aluminum, these faces forming said reflecting faces, the folding element comprises a block comprising two faces, said block being formed from transparent material to allow total reflection of the light on the two faces, the folding element is a prism of which two faces form the two reflecting faces, said device comprises an optical projection system arranged at the output of the device to at least partly produce the light beam, said device comprises a mobile secondary mirror arranged between the folding element and the conversion element on the path of the light rays, the secondary mirror being configured to deflect the light rays in a second direction, the folding element is mobile and configured to make the light rays scan in a second direction, the folding element is fixed, the scan means are configured to make the light rays scan in a second direction, the scan means are provided with a mobile micromirror configured to make the light rays scan in the first direction, the mobile micromirror is also configured to make the light rays scan in the second direction, the conversion element comprises a substrate and a layer of a photoluminescent material, for example comprising phosphorus, or yttrium-aluminum-garnet, called YAG, the light source is at least one laser diode, the central part of the zone is defined in a first direction of extension of said zone, the central part of the zone is defined over the entire extent of the zone in a second direction of extension of said zone, the second direction being different from the first, the central part is situated substantially in the middle of said zone.

The invention relates also to a headlight or to a motor vehicle light comprising such a scan light device.

Figure 2:
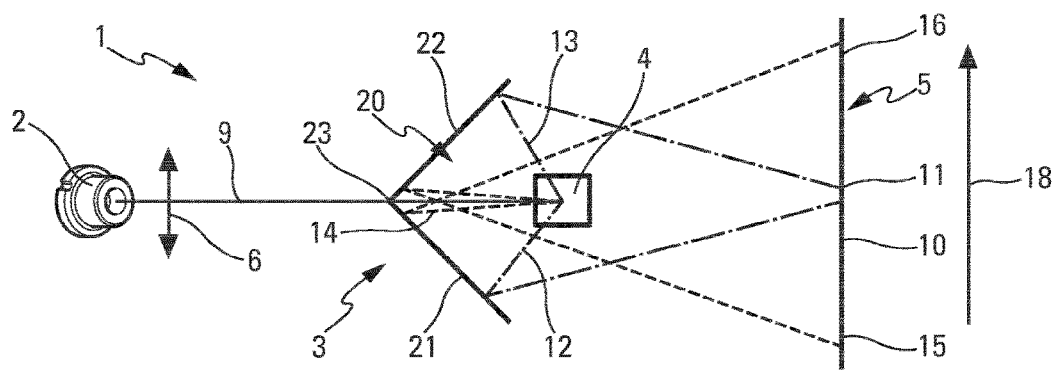
Figure 3:
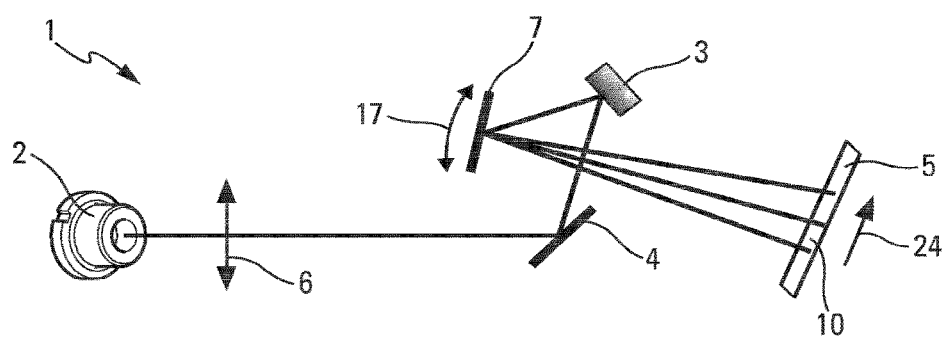

The invention will be better understood in light of the following description which is given purely as an indication and which is not intended to limit it, accompanied by the attached drawings:

FIG. 1 schematically illustrating a side view of a first embodiment of a device according to the invention, FIG. 2 schematically illustrating the device in plan view, the folding element being a mirror, FIG. 3 schematically illustrating a side view of a second embodiment of a device according to the invention.

FIGS. 1 and 3 represent a light device 1, notably for a motor vehicle, according to a first embodiment and a second embodiment of the invention. The device 1 comprises at least one light source 2 capable of emitting light rays 9. Here, the light source 2 is for example one or more laser diodes. The light source 2 can also comprise an optical device combining several laser radiations, for example using optical fibers or devices exploiting different polarizations of different laser sources. The light device 1 comprises, preferably, one or more lenses 6 for collimating the light rays 9 arranged at the output of the source 2.

The device 1 also comprises a wavelength conversion element 5 configured to receive the light rays 9 on a zone 10, and to re-emit a light radiation to produce a light beam, not represented in the figures. The conversion element 5 modifies the wavelength of the rays 9 to obtain the desired color for the illumination of the headlight, for example white light. The conversion element 5 is for example provided with a transparent substrate and a layer of a photoluminescent material, for example a phosphorus-based.

In a first variant, the light rays 9 pass through the conversion element 5, changing color to form the light beam. In a second variant, the conversion element 5 is configured to deflect the light rays 9, the substrate having the properties of a mirror.

The device 1 is, preferably, provided with an optical projection system, not represented in the figures, which is used to project the light beam from the conversion element to the outside of the device. For that, the optical projection system is arranged substantially in the optical axis of re-emission of the light beam from the conversion element.

The device 1 further comprises an element 3 for folding the light rays 9 back to the conversion element 5, and scan means 4 configured to scan the folding element 3 with the light rays 9. The scan means 4 receive the light rays 9 from the source 2 and return it to the folding element 3. Thus, the folding element 3 is positioned on the optical path of the light rays 9, between the scan means 4 and the conversion element 5.

The scan 20 is represented in FIG. 2, which is a plan view of the device 1 of the first embodiment. The scan 20 is performed at a speed that is sufficiently high for the eye not to perceive the scan and for the conversion element to transmit the light rays substantially continuously for the eye. Furthermore, the amplitude of the scan 20 defines the displacement of the light rays 9, and therefore the central positions 14 and extreme positions 12, 13 which they take during the scan 20. The central positions 14 are at the center of the scan 20, and the extreme positions 12, 13 are at the ends of the scan 20.

It can be seen that the scan 20 is performed in a first direction 18, for example horizontal, so as to obtain a horizontal displacement of the light rays 9 on the zone 10. The rays 9 scan the folding element 3 between two extreme positions 12 and 13. The two extreme positions 12 and 13 of the rays 9 are preferably chosen so that the lit zone 10 covers substantially the entire surface of the folding element 3.

According to the invention, the folding element 3 is configured to deflect the extreme positions 12, 13 of the light rays 9 to a central part 11 of the zone 10 of the conversion element 5 so as to form the central part of the light beam. The central part 11 is situated substantially in the middle of said zone 10 and is defined here in a first direction of extension of said zone 10. Thus, the extreme positions of the scan 20, for which illumination is more intense because of the movement of the scan means, form the central part of the light beam, the latter consequently having a greater light intensity than the other parts of the light beam.

Preferably, the folding element 3 is also configured to deflect the central positions 14 of the light rays 9 to the edges 15, 16 of the zone 10 so as to form the sides of the light beam. Thus, the sides of the light beam have a lower intensity than the central part, because the central positions 14 of the scan 20 have a lower intensity than the extreme positions 12, 13.

The folding element 3 thus makes it possible to invert, in the direction 18 of scan, the distribution of the light intensity produced on the conversion element 5 by the scan means 4 and the light rays 9.

In the first embodiment of FIG. 2, the folding element 3 is a mirror provided with two planes forming the two reflecting faces 21, 22, which are adjacent and form a V. The vertex 23 of the V forms the junction between the two reflecting faces 21, 22, the interior of the V being intended to reflect the light rays 9 to the conversion element 5.

The V-shaped mirror is arranged in the axis of the scan means (4) such that the scan 20 of the rays is centered on the mirror, and thus such that the vertex 23 of the V receives and reflects the central positions 14 of the scan 20, whereas the free wings of the V reflect the extreme positions 12, 13. Thus, the central positions 14 of the scan 20 are returned to the two edges 15, 16 of the zone 10.

In another embodiment, not represented in the figures, the folding element is a prism of which two faces form the two reflecting faces. The prism is configured to operate in the same way as the V-shaped mirror.

The scan means 4 are for example provided with a mobile micromirror making it possible to scan the folding element 3 by reflection of the light rays 9 to the folding element 3. The scan 20 is performed in a first direction 18 of the surface of the folding element 3, which is for example a horizontal direction. The micromirror is driven by a periodic movement produced by an actuator (not represented), which uses, for example, a resonance effect of the micromirror provoked, for example by electrodes to make it oscillate. The movement of the micromirror is for example worked about an axis of rotation orthogonal to the first direction 18 in order for the light rays 9 to scan the surface of the folding element 3 in said first direction 18.

In a first variant embodiment of FIG. 1, the folding element 3 is mobile and configured to make the light rays 9 scan in a second direction 24, preferably substantially at right angles to the first direction, in order to produce a movement of the rays which is displaced easily on the conversion element 5. The second direction is for example vertical. Thus, a large zone 10 of the conversion element 5 can easily be scanned by the light rays 9. The movement of the folding element 3 is represented by the arrow 8.

In a second variant embodiment, represented in FIG. 3, a mobile secondary mirror 7 is used, which can also be a micromirror. It is for example arranged between the folding element 3 and the conversion element 5. The secondary mirror 7 is configured to displace the light rays 9 on the conversion element 5 in the second direction 24. The arrow 17 represents the movement of the secondary mirror 7. The folding element 3 is fixed in this second variant.

In a third variant embodiment, the scan means 4 are also configured to scan the conversion element 5 with the light rays 9 in the second direction 24. In other words, it is the same micromirror which scans the surface of the folding element 3 with the light rays 9 in both directions 18, 24. The micromirror therefore follows another movement, for example rotational, about a second axis of rotation at right angles to the preceding one. Thus, the micromirror makes it possible for the light rays to scan the conversion element 5 both horizontally and vertically. The folding element 3 is also fixed in this third variant.

In the above description, the micromirrors mentioned as scan means are for example of MEMS type. However, the invention is in no way limited to this scan means and can use other kinds of scan means such as, for example, a series of mirrors arranged on a rotary element, the rotation of the element generating a scan of the conversion element by the light rays.

The invention claimed is:

1. A motor vehicle illumination device, comprising:
   at least one light source for emitting light rays;
   a wavelength conversion element arranged to receive the light rays on a zone and to re-emit a light radiation to produce a light beam;
   a reflecting element for redirecting light rays from the light source towards the conversion element; and
   a scanning apparatus configured to scan the reflecting element with the light rays in a first direction between extreme positions, the reflecting element being configured to reflect light rays at said extreme positions to a central part of the zone so as to form the central part of the light beam.

2. The illumination device of claim 1, further comprising an optical projection system arranged at an output of the illumination device to at least partly produce the light beam.

3. The illumination device of claim 1, further comprising an adjustable secondary mirror arranged between the reflecting element and the conversion element on a path of the light rays, the secondary mirror being configured to deflect the light rays in a second direction.

4. The illumination device of claim 1, wherein the reflecting element is adjustable and configured to make the light rays scan in a second direction.

5. The illumination device of claim 1, wherein the scanning apparatus is configured to make the light rays scan in a second direction.

6. The illumination device of claim 1, wherein the scanning apparatus is provided with an adjustable micromirror configured to make the light rays scan in the first direction.

7. The illumination device of claim 1, wherein the light source is at least one laser diode.

8. The illumination device of claim 1, wherein the reflecting element is configured to deflect the light rays which are central positions substantially midway between the extreme positions, to edges of the zone to form sides of the light beam.

9. The illumination device of claim 8, wherein the reflecting element is configured to:
   deflect the light rays from a first extreme position to a central position on the zone, such that the light rays scan the zone from said central part of the zone to a first edge of the zone; and
   deflect the light rays from the central position to a second extreme position opposite the first extreme position on the zone, such that the deflected light rays scan the zone from the central part of the zone to a second edge of the zone opposite the first edge.

10. The illumination device of claim 1, wherein the conversion element comprises a substrate and a layer of a photoluminescent material.

11. The illumination device of claim 10, wherein the layer of photoluminescent material comprises phosphorus or yttrium-aluminum-garnet.

12. The illumination device of claim 1, wherein the reflecting element comprises two reflecting faces.

13. The illumination device of claim 12, wherein the reflecting faces are adjacent and form a V, an interior of the V including the reflecting faces.

14. The illumination device of claim 13, wherein the reflecting element is arranged in an axis of the scanning apparatus such that a vertex of the V receives the central positions of the light rays.

15. The illumination device of claim 14, wherein the reflecting element is a mirror provided with two planes forming the two reflecting faces.

16. A motor vehicle headlight comprising:
   a housing; and
   an illumination device arranged within the housing, the illumination device including
      at least one light source for emitting light rays,
      a wavelength conversion element arranged to receive the light rays on a zone and to re-emit a light radiation to produce a light beam,
      a reflecting element for redirecting light rays from the light sources towards the conversion element, and a scanning apparatus configured to scan the reflecting element with the light rays in a first direction between extreme positions, the reflecting element being configured to reflect light rays at said extreme positions to a central part of the zone so as to form the central part of the light beam.

* * * * *